(12) United States Patent
Jikku et al.

(10) Patent No.: US 8,266,361 B1
(45) Date of Patent: Sep. 11, 2012

(54) ACCESS METHODS AND CIRCUITS FOR DEVICES HAVING MULTIPLE BUFFERS

(75) Inventors: John Jikku, Anchal (IN); Venkata Suresh Babu, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 325 days.

(21) Appl. No.: 12/695,935

(22) Filed: Jan. 28, 2010

Related U.S. Application Data

(60) Provisional application No. 61/147,782, filed on Jan. 28, 2009.

(51) Int. Cl.
*G06F 13/36* (2006.01)

(52) U.S. Cl. ........ 710/310; 710/305; 710/306; 710/311; 365/185.11; 365/230.01; 711/103

(58) Field of Classification Search .................. 710/305, 710/306, 310, 311
See application file for complete search history.

(56) References Cited

U.S. PATENT DOCUMENTS

| | | | |
|---|---|---|---|
| 5,307,320 A * | 4/1994 | Farrer et al. ............. 365/230.01 |
| 5,379,401 A * | 1/1995 | Robinson et al. ............. 711/103 |
| 5,388,248 A * | 2/1995 | Robinson et al. ............. 365/52 |
| 5,428,566 A * | 6/1995 | Robinson ..................... 365/63 |
| 6,311,294 B1 | 10/2001 | Larky et al. |
| 6,505,267 B2 | 1/2003 | Luke et al. |
| 6,735,116 B2 | 5/2004 | Lee et al. |
| 7,162,565 B1 | 1/2007 | Kolokowsky et al. |
| 7,231,485 B2 | 6/2007 | Harris et al. |
| 7,295,470 B2 | 11/2007 | Park et al. |
| 7,359,244 B2 * | 4/2008 | Kobayashi et al. ...... 365/185.11 |
| 7,657,699 B2 * | 2/2010 | Murin et al. .................. 711/103 |
| 7,843,758 B2 * | 11/2010 | Byeon ....................... 365/230.05 |
| 7,895,387 B1 * | 2/2011 | Khodabandehlou et al. . 710/316 |
| 7,978,516 B2 * | 7/2011 | Olbrich et al. ........... 365/185.11 |
| 8,037,228 B2 * | 10/2011 | Maheshwari et al. ....... 710/306 |
| 8,090,894 B1 * | 1/2012 | Khodabandehlou et al. . 710/313 |
| 8,149,622 B2 * | 4/2012 | Lee et al. ................. 365/185.18 |
| 2005/0268025 A1 * | 12/2005 | Smith et al. .................... 711/103 |
| 2007/0061538 A1 | 3/2007 | Chang et al. |
| 2007/0079045 A1 | 4/2007 | Luke |
| 2008/0071963 A1 * | 3/2008 | Chow et al. ................... 710/313 |
| 2008/0235442 A1 | 9/2008 | Chae |
| 2008/0250195 A1 | 10/2008 | Chow et al. |
| 2008/0270663 A1 * | 10/2008 | Fry et al. ..................... 710/301 |
| 2009/0027967 A1 | 1/2009 | Lee |
| 2009/0190403 A1 | 7/2009 | Kwak |

OTHER PUBLICATIONS

Cypress—"CYWB0124AB—West Bridge: Antioch USB/Mass Storage Peripheral Controller"; 2 pages, Dated Oct. 24, 2006.*
Inoue et al., NAND Flash Applications Design Guide—Systems Solutions from Toshiba America Electronic Components, Inc., Apr. 2003.
Lee et al., Abstract of: A new NAND-type flash memory package with smart buffer system for spatial and temporal localities, Journal of Systems Architecture, Feb. 2005, vol. 51, Issue 2, pp. 111-123.
Cypress Semiconductor Corporation, CYWB0224ABS/M West Bridge(TM) Astoria(TM) Advance Information, Dec. 7, 2007.

(Continued)

*Primary Examiner* — Brian Misiura

(57) ABSTRACT

An integrated circuit device may include a mask register that stores mask values writable from a processor interface; and mask logic that selectively masks status indications from each of a plurality of buffers according to stored mask values; wherein the buffers alter the status indications in response to accesses from at least one different interface other than the processor interface.

20 Claims, 7 Drawing Sheets

OTHER PUBLICATIONS

Huen, Hingkwan, Interfacing TI OMAPV1030 Processor to Astoria's Pseudo-NAND Processor Port, Cypress Semiconductor Corporation Application Note AN47864, Aug. 4, 2008.

NXP Semiconductors, AN10860 LPC313x NAND flash data and bad block management, NXP Semiconductors Application Note, Aug. 2009.

Cypress Semiconductor Corporation, CYWBO2XX Family West Bridge(R) Astoria Advance Data Sheet, Sep. 23, 2009.

HCL, AHB Compliant Nand Flash Controller, available at Internet http://www.hcltech.com/pdf/engineering-services/intellectual-properties/Nand Flash Controller.pdf.

* cited by examiner

ACCESS METHODS AND CIRCUITS FOR DEVICES HAVING MULTIPLE BUFFERS

This application claims the benefit of U.S. provisional patent application having Ser. No. 61/147,782 filed on Jan. 28, 2009, the contents of which are incorporated by reference herein.

TECHNICAL FIELD

The present disclosure relates to devices having multiple buffers accessed by more than one interface.

DETAILED DESCRIPTION

Figure 1:
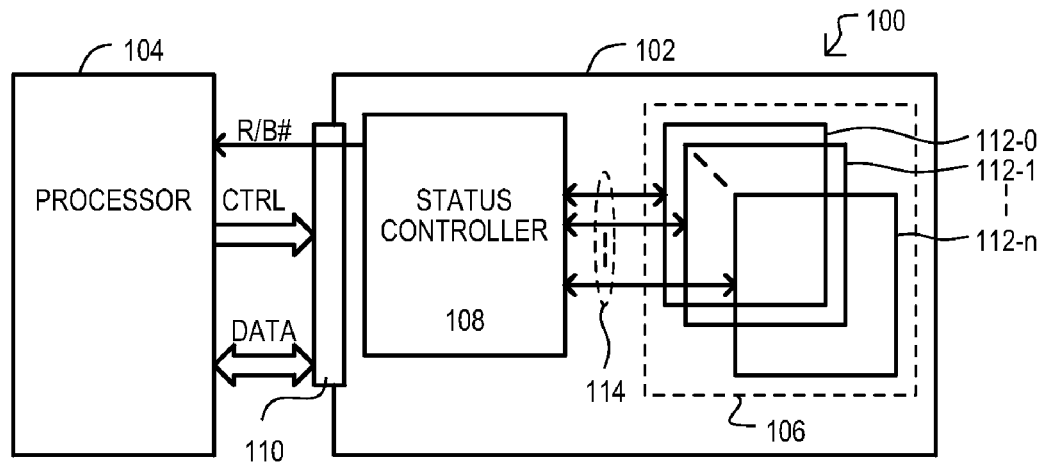
FIG. 1 shows a system according to an embodiment.

Various embodiments will now be described that show devices, methods and systems in which any of multiple buffers may indicate a status to controller device, such as a processor, to request transactions be executed on such buffers.

In the various embodiments described herein, like sections may be referred to by the same reference character but with the leading digit corresponding to the figure number.

Referring now to FIG. 1, a system according to a first embodiment is shown in a block schematic diagram and designated by the general reference character 100. A system 100 may include an integrated circuit device 102 and a processor device 104. An integrated circuit device 102 may include a buffer section 106, a status controller 108, and a processor interface 110.

A buffer section 106 may include a number of buffers 112-0 to -n, each of which may store data. Buffers (112-0 to -n) may provide status indications 114 to status controller 108. Status indications 114 may indicate an operational state for each buffer. In one embodiment, status indications may indicate when a buffer (112-0 to -n) is free to execute an operation (e.g., is ready), or when a buffer (112-0 to -n) is undergoing some operation, or is otherwise not free to execute an operation (e.g., is busy).

In one particular embodiment, buffers (112-0 to -n) may enable transfers of data between multiple interfaces of an integrated circuit device 102, including processor interface 110. Further, in particular embodiments, buffers (112-0 to -n) may be formed from volatile memory circuits, such as static random access memory (SRAM) or dynamic RAM circuits, and serve as buffers for the transfer of data to nonvolatile storage circuits and/or other devices. However, in alternate embodiments, buffers (112-0 to -n) may include nonvolatile storage circuits.

A status controller 108 may receive status indications 114, and generate a single output value from such indications. In the particular embodiment shown, a status controller 114 may generate an active low, read/busy signal (R/B#), compatible with processor interfaces having such signal. A status controller 108 may logically combine status indications 114 so that signal R/B# indicates "ready" (RDY) when any of status indications has a ready state. That is, a signal R/B# may indicate when any of buffers (112-0 to -n) is ready, rather than a single such buffer.

A status controller 108 may also selectively mask status indications 114. In particular, when a processor device 104 directs operations to a targeted buffer (112-0 to -n), all status indications except that of the targeted buffer may be masked (forced to busy), until such operations are concluded.

A processor interface 110 may enable a processor device 104 to communicate with integrated circuit device 102. A processor interface 110 may enable processor device 104 to apply commands (e.g., read data, write data, read registers, write registers), apply addresses, and transfer data to/from integrated circuit device 102. However, at the same time, R/B# signal may allow integrated circuit device 102 to indicate to a processor device 104 that operations are requested at one or more buffers. This is in contrast to systems in which devices have buffers that accessed only by transactions initiated by a processor device (i.e., buffers are entirely slaves).

In the very particular embodiment of FIG. 1, a processor interface 110 may provide the R/B# signal, receive control values CTRL, and include a bi-directional data path DATA.

A processor device 104 may initiate transactions to buffers (e.g., read operations, write operations). In addition, a processor device 104 may respond to signal R/B#, to thereby execute commands in response to changes in such a signal. In one particular embodiment, a processor device 104 may be designed to be compatible to access devices with but one buffer. However, inclusion of status controller 108 may enable processor device 104 to support access to and/or control of multiple buffers.

In this way, a system may include an integrated circuit device that may signal to a controller device, such as a processor, a status of multiple buffers with a single signal.

Figure 2:
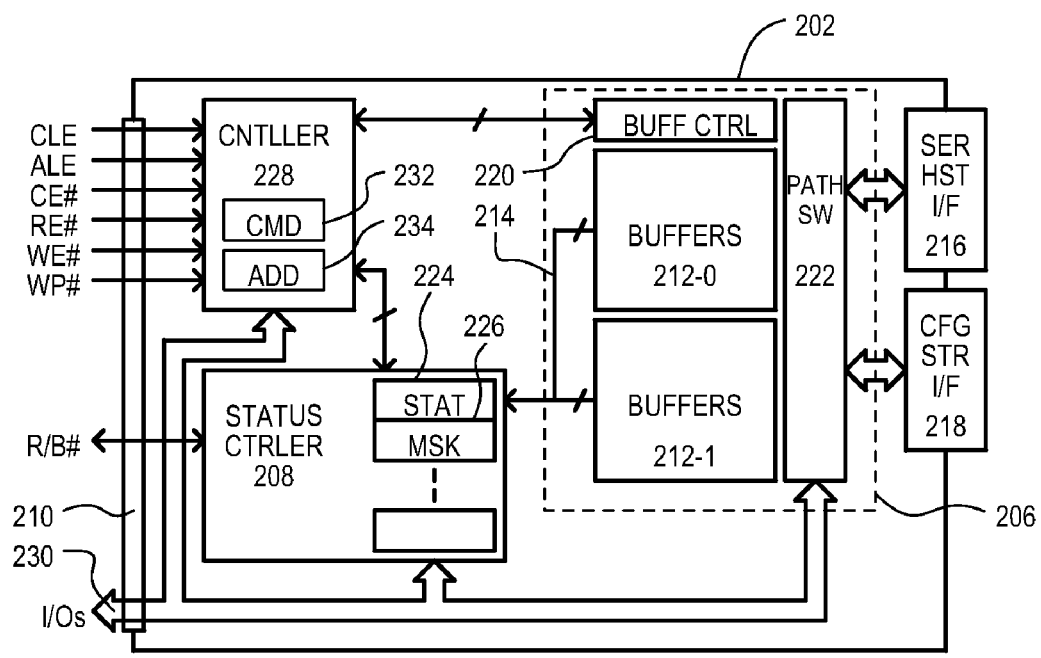
FIG. 2 shows a bridge device according to an embodiment.

Referring now to FIG. 2, a bridge device according to an embodiment is shown in a block schematic diagram and designated by the general reference character 202. A bridge device 202 may be one example of an integrated circuit device like that shown as 102 in FIG. 1.

A bridge device 202 may include a buffer section 206, a status controller 208, a processor interface 210, a serial interface 216, a storage device interface 218, and a controller circuit 228. A bridge device 202 may allow data to be transferred, via buffer section 206, between any of interfaces 210, 216 and 218. Accordingly, while buffer section 206 may be accessed via processor interface 210, buffer section 206 may also be accessed via serial interface 216 and/or storage device interface 218.

In the embodiment of FIG. 2, a buffer section 206 may include a first buffer group 212-0, a second buffer group 212-1, a buffer control circuit 220, and a path switching circuit 222. A first buffer group 212-0 may include multiple buffers that store data related to serial interface 216. A second buffer group 212-1 may include multiple buffers that store data related to storage interface 218.

A buffer control circuit 220 may control buffer operations, including transfers of data into buffers, as well as transfers of data from such buffers. In one embodiment, a buffer control circuit 220 may process commands from a NAND type memory controller, including page reads and page programs. A buffer control circuit 220 may also control path switching circuit 222 to enable data transfers between a buffer of a group (e.g., 212-0 or -2) and an interface (e.g., 210, 216, or 218).

A status controller 208 may include a status register 224 and a mask register 226. A status register 224 may store status indications 214 corresponding to buffers of buffer section 206. A mask register 226 may store mask values that may selectively mask values of status register 224 (or status indications 214). Status controller 208 may logically combine values from status register 224, as masked by values within mask register 226 to generate overall status indicator R/B#.

A status register 224 may be readable by processor interface 210. In the embodiment shown, status register 224 may be read via processor inputs/outputs (I/Os) 228. This may allow a processor to read status indications stored in status register 224 and thereby determine which buffers within buffer section 206 have a ready status.

A mask register 226 may be writable from processor interface 210. In the embodiment shown, a mask register 226 may be written via processor I/Os 230. This may allow a processor to mask status indications for other buffers as transactions are undertaken on a targeted buffer.

A processor interface 210 may provide input paths for control signals to bridge device 202, provide a path for single status indicator (e.g., R/B#), and provide a path for processor I/Os 230. In a very particular embodiment, a processor interface 210 may be compatible with a "NAND" type controller (i.e., a controller for NAND-type "flash" electrically erasable programmable read-only-memories (EEPROMs)). Accordingly, input paths may accommodate various NAND type control signals, including but not limited to: a command latch enable (CLE) signal, for latching command data on processor I/Os 230, an address latch enable (ALE) signal, for latching address data on processor I/Os 230, a chip enable signal (CE#), a read enable (RE#) signal, a write enable (WE#) signal, and a write protect (WP#) signal. Alternate embodiments, may accommodate different types of controllers devices. Further, in still other embodiments, a processor interface 210 may be programmable to accommodate different types of processor/controller devices.

A serial interface 216 may provide an interface for communicating with another device according to a serial data transfer protocol. In particular, a serial interface 216 may receive data in a serial form, convert such data to parallel form (e.g., decode, etc.) and provide such data to a targeted buffer within buffer section 206. In one embodiment, a serial interface 216 may be a Universal Serial Bus (USB) interface that connects to a host USB device.

A storage device interface 218 may provide an interface for communicating with a mass storage device according to a predetermined protocol. Such an interface 218 may enable data to be transferred between mass storage devices and buffer section (206) (and hence between processor interface 210 and serial interface 216). In one particular embodiment, storage device interface 218 may include multiple connections for accommodating solid state storage devices, including those utilizing NAND type flash memory.

A controller circuit 228 may control operations on a bridge device 202, including controlling buffer section 206. In the particular embodiment of FIG. 2, a controller circuit 228 may include a command latch 232 and an address latch 234. A command latch 232 may store command data (e.g., page read, page program, register read, register write) for execution by bridge device 202. An address latch 234 may be store address data for data access operations (e.g., page reads, page writes).

In this way, a bridge device may include a status register readable by a processor interface that stores status indications for multiple buffers, as well as a mask register writable by the processor interface. A mask register may store mask data that masks predetermined status indications when generating an overall status indication for all buffers.

While the embodiments may include systems and bridge devices, other embodiments may include methods of controlling accesses to multiple buffers. One such method embodiment is shown in FIG. 3.

Figure 3:
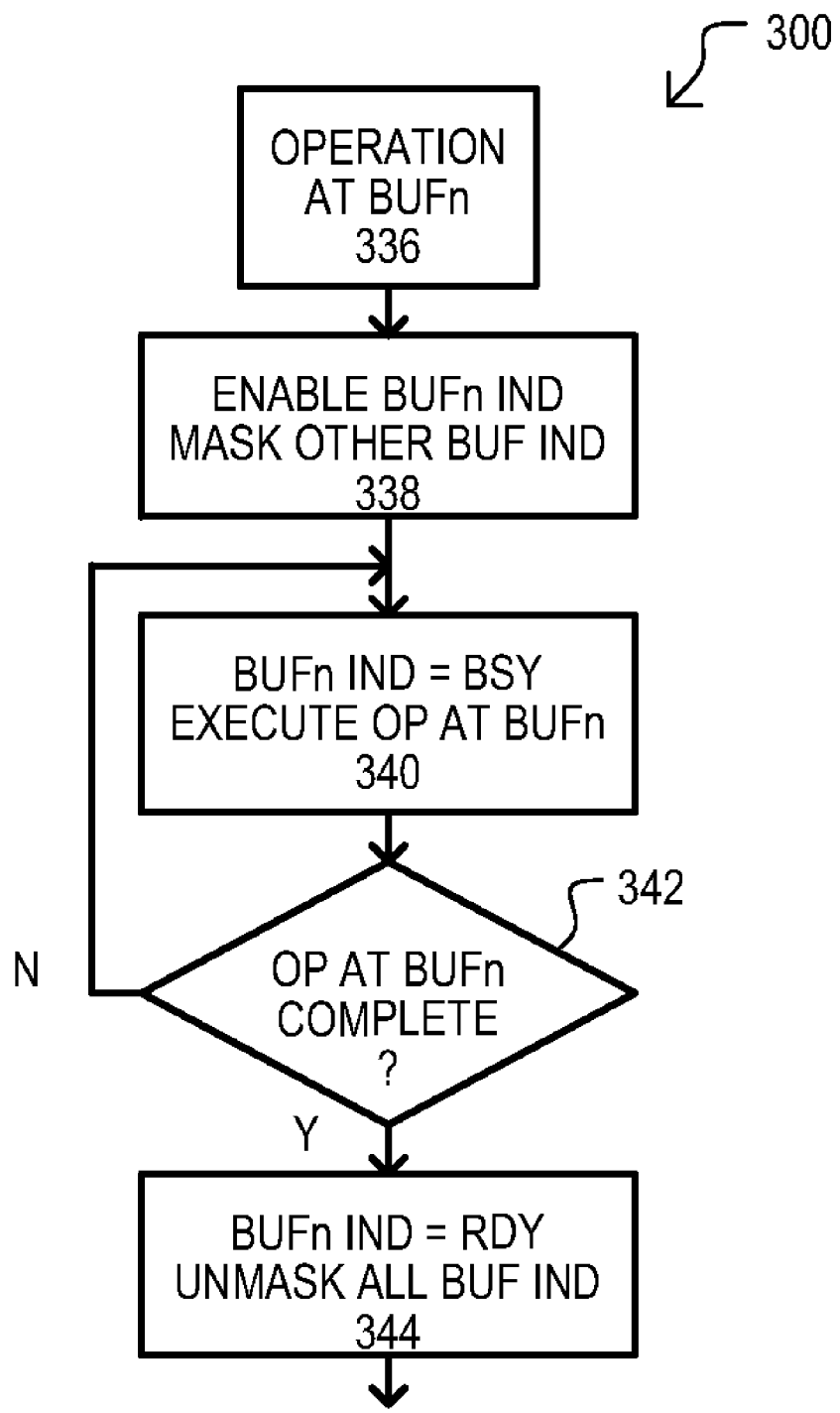
FIG. 3 is a flow diagram showing a method according to an embodiment.

Referring to FIG. 3, a method according to an embodiment is shown in a flow diagram and designated by the general reference character 300. A method 300 may include determining that an operation is to occur at one of many buffers (BUFn) (box 336). A method 300 may enable a status indication for the one buffer (BUFn IND), and mask indications for all other buffers (box 338).

A method 300 may then execute an operation at the targeted buffer (BUFn) as the corresponding buffer indication (BUFn IND) is set to a busy state (BSY) (box 340). If an operation is not considered complete (N from box 342), a method 300 may continue asserting BUFn IND to the BSY state. If an operation is considered complete (Y from box 342), a corresponding buffer indication (BUFn IND) may be set to a ready state (RDY), and all other buffer indications may be unmasked (box 344).

In this way, a method may mask indications for all but a targeted buffer as operations are performed on such a buffer, and then unmask all buffer indications once operations are complete at the targeted buffer.

Referring to FIGS. 4A to 4F, various operations of a device will now be described in a sequence of block diagrams. FIGS. 4A to 4F show a bridge device 402 having a buffer section 406 and a status controller 408. A bridge device 402 may be one example of a device like that shown as 102 in FIG. 1 and/or one like that shown as 202 in FIG. 2.

A buffer section 406 may include a number of buffers that may each provide a status indication. In the embodiment shown, buffer section 406 may include eight buffers BUF0 to BUF7.

A status controller 408 may include a status register 424, a mask register 426, mask logic 446, and combining logic 448. Status register 424 may store a status indication for each of buffers BUF0 to BUF7. Mask register 426 may store a mask value corresponding to each stored value in status register 424. In the convention of FIGS. 4A to 4F, a mask value of "0" indicates no mask, while a mask value of "1" indicates a valid mask. Mask logic 446 may selectively mask values stored in status register (i.e., force such values to a BSY state) based on the values of mask register 426. Combining logic 448 may combine status indications (as modified by mask logic 446) to generate a single buffer status value R/B#. Combining logic 448 may force its output (R/B#) to a ready state (RDY) when any of outputs from combining logic 448 has a ready state.

Figure 4A:
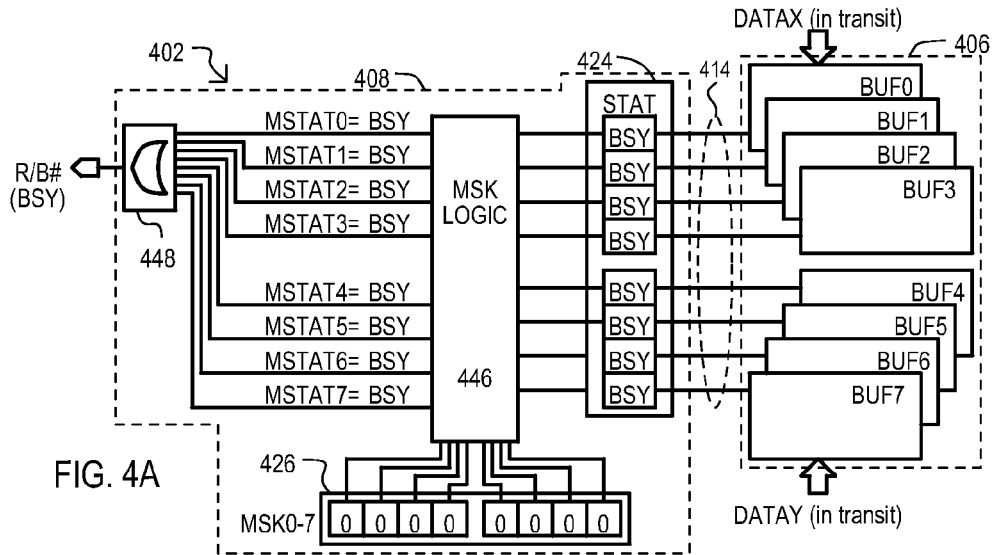
FIGS. 4A to 4F are a sequence of block schematic diagrams showing a bridge device and methods according to embodiments.

Referring now to FIG. 4A, buffers BUF0 and BUF7 may receive data. All buffers at this time may be outputting a BSY status indications, thus status register 424 may store all BSY values. Mask values MSK0-7 of mask register are all in a non-masking state. Combining logic 448 receives all BSY indications, and thus forces output RIB# to a BSY state.

Figure 4B:
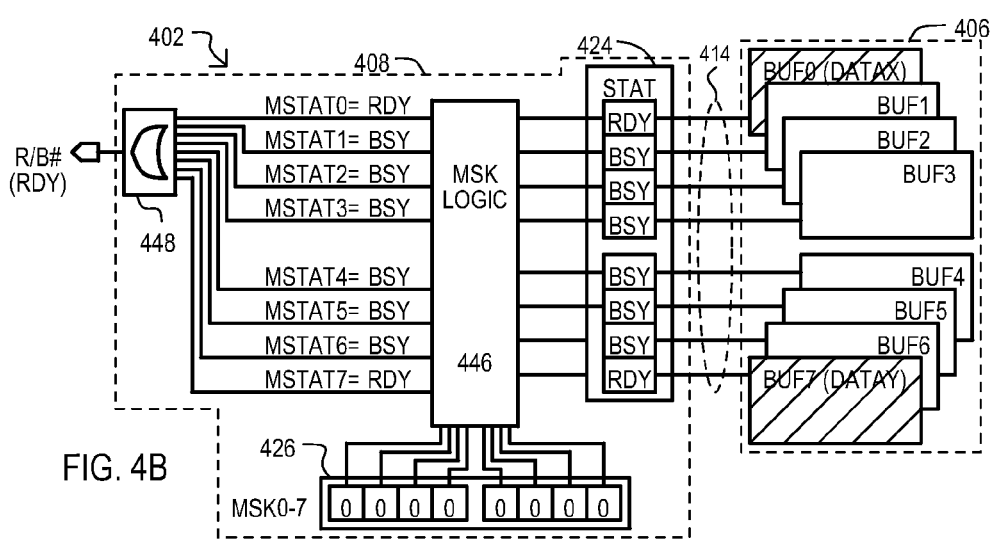

Referring to FIG. 4B, in response to receiving data, status indications for buffers BUF0 and BUF7 may switch to the RDY state. Mask values MSK0-7 remain inactive, thus mask logic 446 may output two signals in the RDY state. In response, combining logic 448 may force RIB# to a RDY state. This may signify to another device (e.g., processor) that transactions are to occur at one or more of buffers BUF0-BUF7.

Figure 4C:
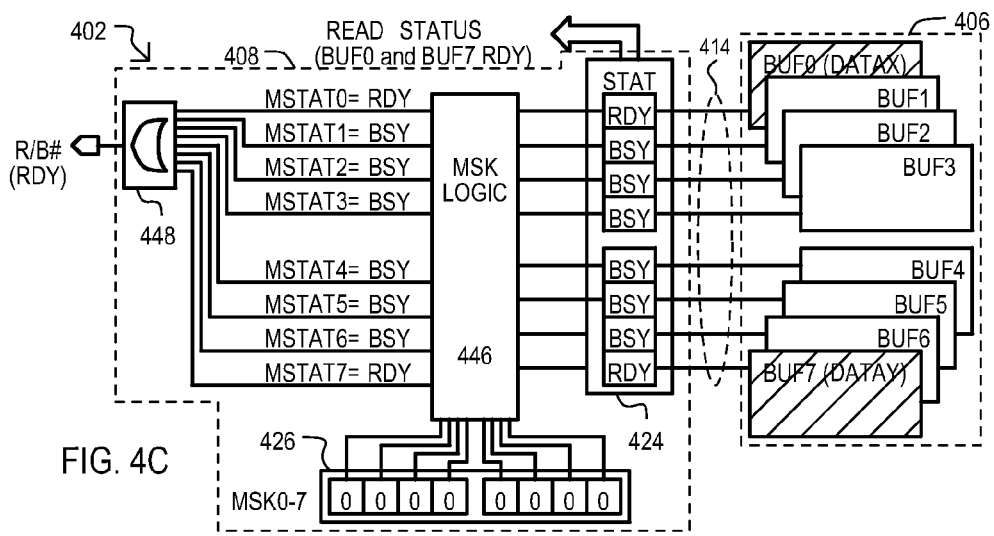

Referring to FIG. 4C, a device (e.g., processor) may perform a read status operation that reads status indications from status register 424. Such data may indicate that it is buffers BUF0 and BUF7 that are ready for a transaction. In response to such a read operation, the device (e.g., processor) may select one of the buffers to be a first targeted buffer for a transaction.

Figure 4D:
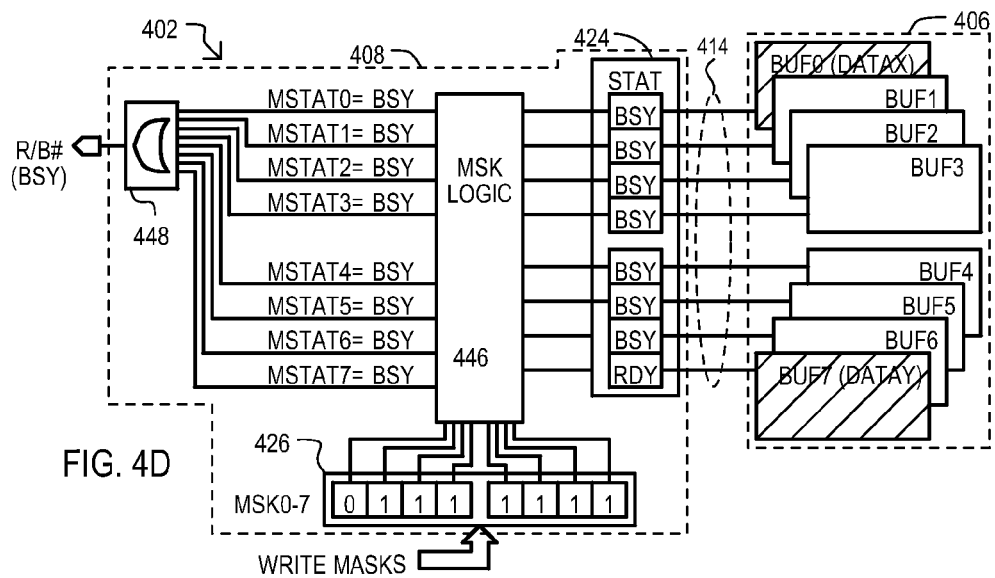

Referring to FIG. 4D, as noted above, in the particular embodiment shown, more than one buffer is ready (BUF0 and BUF7), thus, an inquiring device (e.g., processor) may select one of the buffers to control first. It is assumed that buffer BUF0 is accessed first. Accordingly, a mask value may be written into mask register 426 that masks all but the status indication for buffer BUF0. In addition, as operations are performed on the accessed buffer (BUF0) the status indication for the buffer may be set to BSY. Consequently, combining logic 448 may drive RIB# to a BSY state.

Figure 4E:
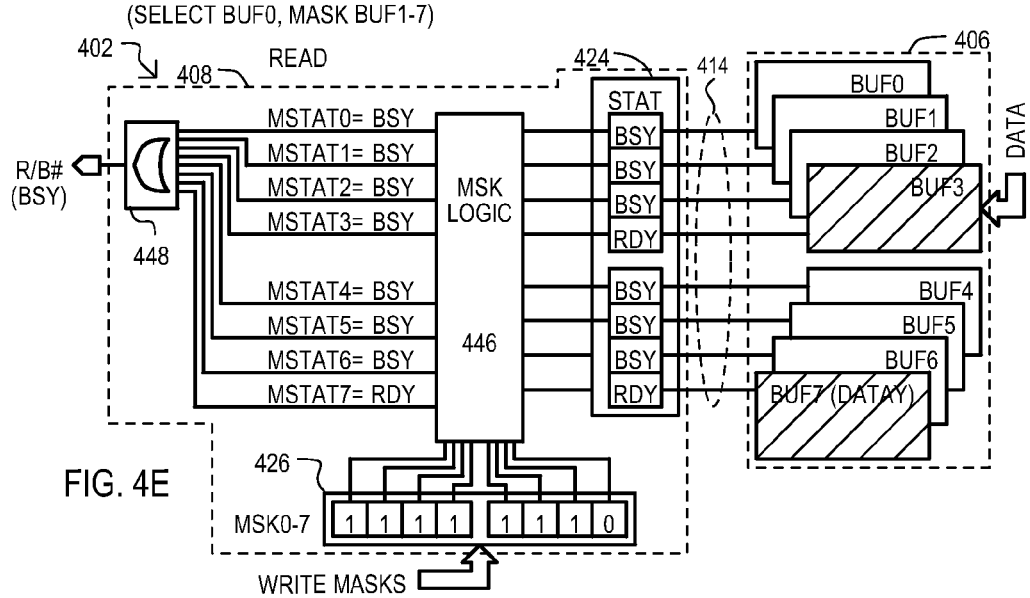

Referring to FIG. 4E, from the read status operation of FIG. 4C, an inquiring device (e.g., processor) already knows that buffer BUF7 is also ready. Accordingly, the inquiring device may perform back-to-back operations, accessing BUF7 after accessing BUF0. As in the case of FIG. 4D, a mask value may be written into mask register 426 that masks all status indications except for that of buffer BUF7. As operations are performed on the accessed buffer (BUF7) the status indication for the buffer may be set to BSY. Consequently, combining logic 448 may drive RIB# to a BSY state. In the embodiment shown, during this time a new buffer BUF3 may indicate a ready state. However, due to masking, such a value will not result in RIB# being driven to the RDY state.

Figure 4F:
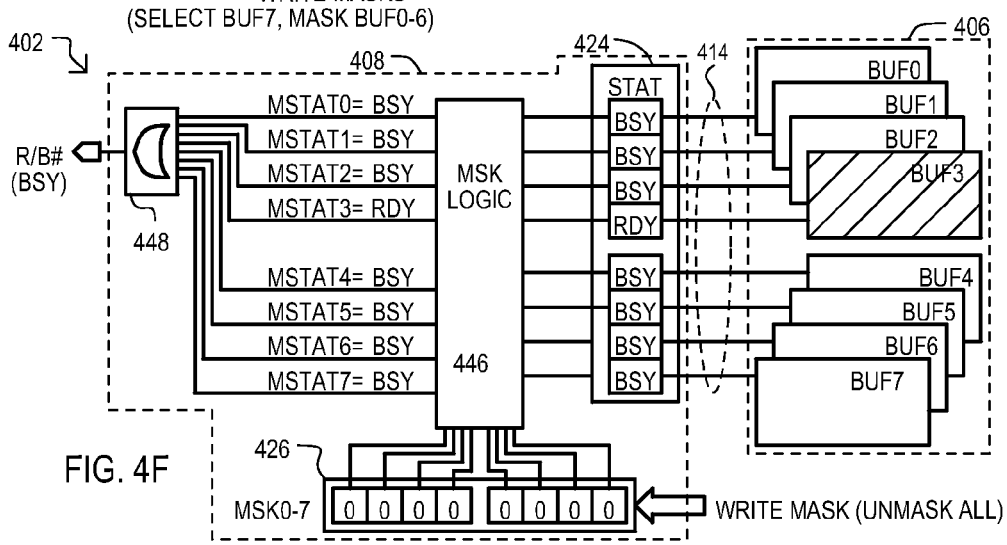

Referring to FIG. 4F, once operations for all buffers BUF0 and BUF7 have been addressed, a controlling device (e.g., a processor) may write a mask value to mask register 426 that removes all masking. Consequently, because buffer BUF3 is ready, combining logic 448 may drive signal RIB# to the RDY state, signifying once again that operations are to be performed on one of the buffers BUF0 to BUF7.

In this way, a status indication value may be read to perform back-to-back operations in the event more than one buffer is ready for an operation.

Figure 5:
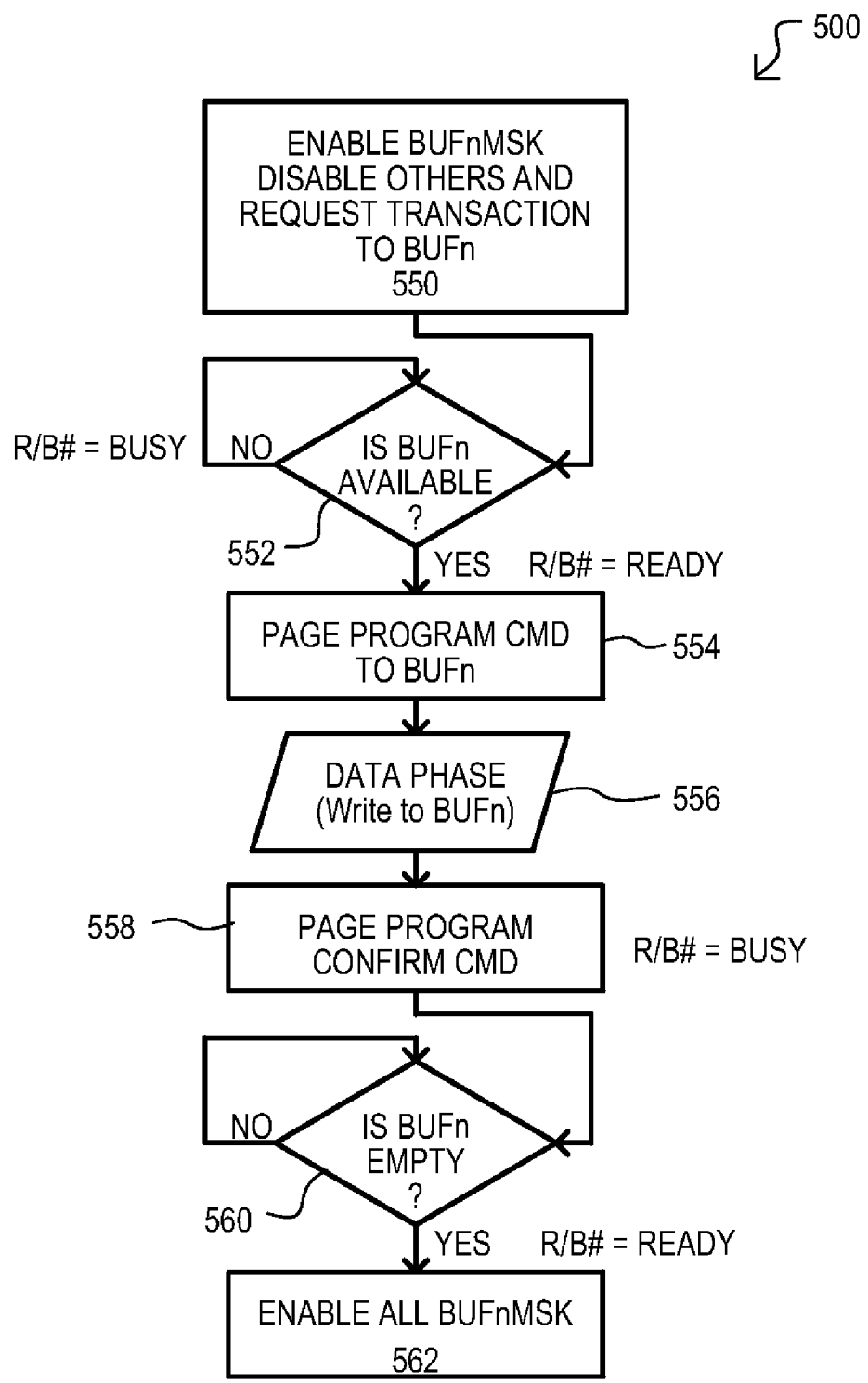
FIG. 5 is a flow diagram of a write transaction method according to one embodiment.

Referring now to FIG. 5, a write transaction to a buffer according to one embodiment is shown in a flow diagram and designated by the general reference character 500.

A write method 500 may include enabling a buffer mask (BUFnMSK) (i.e., not mask a status indication corresponding to the buffer) for the buffer subject to the write transaction, while disabling all other masks (i.e., masking all other status indications). In addition, a transaction request may be made for the targeted buffer (BUFn) (box 550). If the buffer (BUFn) subject to the write transaction is not ready (NO from box 552), its corresponding status indication may be BSY. Consequently, an overall status indication R/B# may be BUSY, indicating to the requesting device (e.g., processor) that a write transaction may not yet take place.

If the buffer (BUFn) subject to the write transaction is ready (YES from box 552), its corresponding status indication may be READY. Consequently, an overall status indication R/B# may be READY, indicating to the requesting device (e.g., processor) that a write transaction may take place.

In response to the R/B# ready state, a requesting device (e.g., processor) may send a page program command directed to the buffer (BUFn) (box 554). In response to a program command, a data phase may be undertaken, which may include sending write data to the buffer (box 556). Write data stored by the buffer may then be written to a storage location. In the particular embodiment of FIG. 5, it is assumed that data is written to a nonvolatile memory location. Accordingly, a page program command may be confirmed (box 558). In response to such an action, a status indicator for the buffer (BUFn) may set to the BUSY state, as data is written from the buffer. Consequently, signal R/B# may be driven to the BUSY state. While the buffer is not empty (e.g., has not written all of its data) (NO from box 560), signal R/B# may remain in the busy state.

When the buffer is empty (e.g., all data has been written from the buffer) (YES from box 560), signal R/B# may return to the ready state. In addition, all buffer masks may be enabled (i.e., none of the status indications are masked) (box 562).

In this way, write operations that use any of multiple buffers may be accomplished by masking and unmasking status indications for such buffers.

Figure 6:
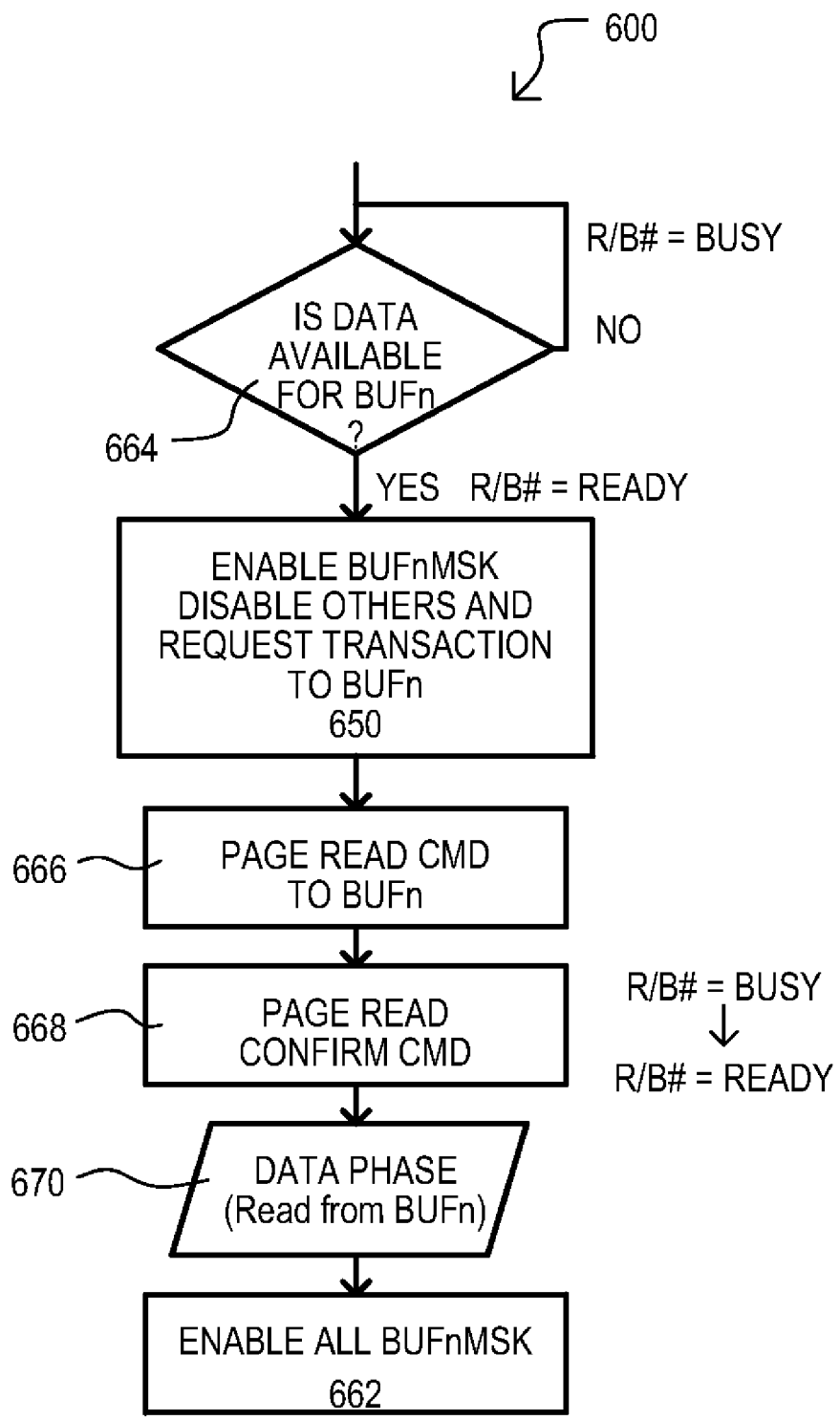
FIG. 6 is a flow diagram of a read transaction method according to one embodiment.

Referring now to FIG. 6, a read transaction to a buffer according to one embodiment is shown in a flow diagram and designated by the general reference character 600.

A read method 600 may include determining if data is available for a buffer (BUFn) (box 664). If data for the buffer (BUFn) is not available (NO from box 664), its corresponding status indication may be BUSY. Consequently, an overall status indication R/B# may be BUSY, indicating to the requesting device (e.g., processor) that the read transaction may not yet take place.

In response to the R/B#=READY indication (YES from box 664), a buffer mask (BUFnMSK) for the buffer subject to the read transaction may be enabled (i.e., not mask a status indication corresponding to the buffer), while all other masks are disabled (i.e., all other status indications are masked). In addition, a transaction request may be made for the targeted buffer (BUFn) (box 650).

A requesting device (e.g., processor) may send a page read command to the buffer (BUFn) (box 666). Accordingly, a page read command may be confirmed (box 668). In response to the page read command, read data being sent to the buffer. During this time, signal R/B# may be driven to the BUSY state. When all read data is in the buffer, signal R/B# may return to the READY state.

Referring still to FIG. 6, with read data in the buffer, a data phase may be undertaken, which may include data being read from the buffer (box 670). With data read from the buffer, all buffer masks may be enabled (i.e., none of the status indications are masked) (box 662).

In this way, read operations that use any of multiple buffers may be accomplished by masking and unmasking status indications for such buffers.

Figure 7:
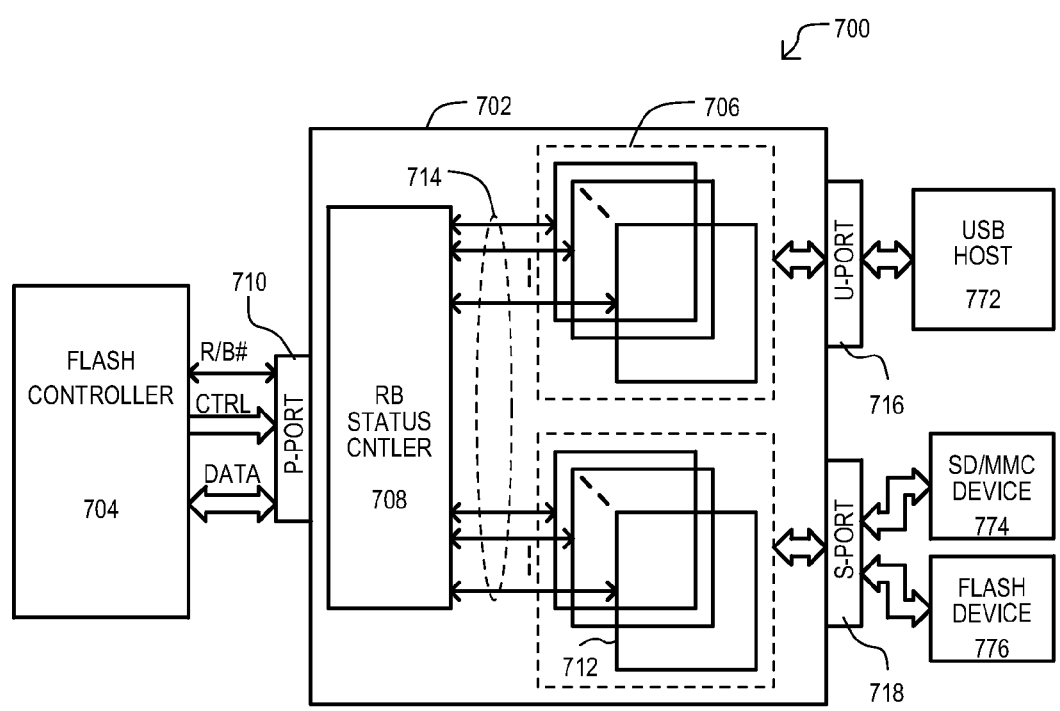
FIG. 7 is a block schematic diagram of a system according to another embodiment.

Referring now to FIG. 7, another system according to an embodiment is shown in a block schematic diagram and designated by the general reference character 700. In one particular embodiment, a system 700 may be one variation of that shown in FIG. 1.

A system 700 may include a bridge device 702, which may be one variation of that shown in FIG. 2 and/or FIG. 4A. A flash controller 704 may be connected to a bridge device 702 at a processor interface 710. A USB host device 772 may be connected to bridge device 702 at a serial interface 716. Storage devices 774 and 776 may be connected to bridge device 702 at storage device interface 718. In the particular embodiment shown, a storage device 774 may be a secure digital (SD) type multimedia card (MMC), while a storage device 776 may be another type of flash memory device.

A bridge device 702 may include a status controller 708 which may receive status indications 714 from buffer section 706. Buffer section 706 may include a number of buffers (one shown as 712). A bridge device 702 may enable flash controller 704 and USB host device 772 to access storage devices 774 by operation of buffers (e.g., 712).

In particular embodiments, a bridge device 702 may provide interleaved and arbitrated access between processor interface 710, serial interface 716 and storage interface 718 to enable a flash controller 704 and USB host device 776 to transfer data between one another and to storage devices (774 and 776) substantially simultaneously. A status controller 708 may indicate to flash controller 704, via signal R/B#, when read and/or write transactions for buffers can be initiated. Accordingly, even though a flash controller 704 may have one signal line (i.e., R/B#) it may still control access to multiple buffers.

In a very particular embodiment, a bridge device 702 may be an integrated circuit separate from flash controller 704, USB host device 772 and storage devices (774 and 776).

In this way, a bridge device having multiple buffers may be controlled by a flash controller to initiate data transfers between multiple ports using such buffers.

It should be appreciated that in the foregoing description of exemplary embodiments. Various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

It is also understood that the embodiments of the invention may be practiced in the absence of an element and/or step not specifically disclosed. That is, a feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. An integrated circuit device, comprising:
   a status controller configured to logically combine status indications from a plurality of different buffers, to generate a single ready/busy indication output signal representing a state of the plurality of different buffers, the status controller configured to receive from a processor an access command targeting one of the plurality of different buffers responsive to a change in the single ready/busy indication and mask the status indications for all but the targeted one of the plurality of different buffers responsive to the access command, wherein if the unmasked status indication indicates that the targeted buffer is available, the status controller is configured to force the unmasked status indication to indicate that the targeted buffer is not available when the buffer is being accessed, and upon completion of the targeted buffer being accessed, unmask all of the status indications.

2. The integrated circuit device of claim 1, wherein the status controller includes a status buffer configured to store at least one status bit for each buffer.

3. The integrated circuit device of claim 1, wherein the status controller includes a mask register configured to store a mask value that forces status indications to a predetermined value before such values are logically combined to generate the ready/busy signal.

4. The integrated circuit of claim 1, wherein the status controller includes combining logic configured to drive the single ready/busy indication to a ready state when any one of the status indications is in a ready state.

5. The integrated circuit device of claim 1, further including a processor interface (I/F) formed in the integrated circuit configured to provide the ready/busy indication to an external connection to the integrated circuit, wherein the status controller and buffers are part of a same integrated circuit.

6. The integrated circuit device of claim 5, wherein the processor I/F is an interface to control at least one nonvolatile memory device.

7. The integrated circuit device of claim 1, wherein the buffers comprise volatile memory circuits.

8. An integrated circuit device, comprising:
   a mask register configured to store mask values writable from a processor interface; and
   mask logic configured to selectively mask status indications from each of a plurality of buffers according to stored mask values, wherein the status indications change in response to accesses to their respective buffers, wherein the mask logic is configured to selectively mask all but one of the status indications in response to a change in at least one of the status indications, wherein if the unmasked status indication indicates that a buffer is available, the mask logic is configured to force the unmasked status indication to indicate the buffer is not available when the buffer is being accessed, and upon completion of the buffer being accessed, unmask all status indications.

9. The integrated circuit device of claim 8, further including combining logic configured to combine status indications as masked by the mask logic to generate a single status indication for access by the processor interface.

10. The integrated circuit device of claim 8, wherein the processor interface is compatible with a nonvolatile memory storage device controller, and includes a command latch enable input, an address latch enable input, and a set of input/outputs (I/O) configured to carry read data output from buffers, write data for storage in buffers, address data, and command data.

11. The integrated circuit device of claim 8, further including a different interface in addition to the processor interface, the different interface selected from a serial interface and a mass storage device interface.

12. The integrated circuit device of claim 11, wherein the serial interface includes a Universal Serial Bus interface, and the mass storage device interface is compatible with device having nonvolatile electrically erasable memory cells as a storage medium.

13. The integrated circuit device of claim 8, further including at least a first interface and second interface in addition to the processor interface, the first interface configured to access a first group of the buffers and the second interface configured to access a second group of the buffers that is different than the first group of the buffers.

14. A method comprising:
   requesting, from a processor, a transaction for any of a plurality of memory buffers by logically combining status indications for the memory buffers to generate a single ready/busy indication for the processor;
   responsive to a command associated with the transaction, from the processor, masking status indications for all but one memory buffer when executing the transaction on the one memory buffer, wherein if the unmasked status indication indicates the one memory buffer is available, forcing the unmasked status indication to indicate the one memory buffer is not available when executing the transaction; and upon completion of executing the transaction, unmasking all status indications.

15. The method of claim 14, wherein generating the single ready/busy indication includes activating the ready/busy indication when any one of the status indications represent a requested transaction for its corresponding memory buffer.

16. The method of claim 14, wherein masking the status indications includes a processor writing a mask value to a register of an integrated circuit containing the memory buffers, wherein the processor is not formed in a same integrated circuit as the memory buffers.

17. The method of claim 14, including:
in a write operation from one memory buffer to another storage location, masking all status indication except the status indication for the one memory buffer;
if the unmasked status indication indicates the one memory buffer is available, writing data from one buffer while forcing the unmasked status indication to indicate the one memory buffer is not available; and
upon completion of writing data from the one buffer, unmasking all status indications.

18. The method of claim 17, wherein the processor is a controller for nonvolatile memory device, and the write operation includes a page program command.

19. The method of claim 14, including:
detecting an active ready/busy indication with the processor;
determining one buffer to read data from;
masking all status indications except the status indication for the one memory buffer;
forcing the unmasked status indication to indicate the one memory buffer is not available as data is ready; and
upon completion of reading data from the one buffer, unmasking all status indications.

20. The method of claim 19, wherein the processor is a controller for nonvolatile solid state memory devices, and the read operation includes a page read command.

\* \* \* \* \*